US007110946B2

(12) United States Patent
Belenger et al.

(10) Patent No.: US 7,110,946 B2
(45) Date of Patent: Sep. 19, 2006

(54) SPEECH TO VISUAL AID TRANSLATOR ASSEMBLY AND METHOD

(75) Inventors: Robert V. Belenger, Raynham, MA (US); Gennaro R. Lopriore, Somerset, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 861 days.

(21) Appl. No.: 10/292,955

(22) Filed: Nov. 12, 2002

(65) Prior Publication Data

US 2004/0093212 A1 May 13, 2004

(51) Int. Cl.
*G10L 15/00* (2006.01)

(52) U.S. Cl. ...................................... 704/235; 704/251

(58) Field of Classification Search ................ 704/235, 704/251
See application file for complete search history.

(56) References Cited

U.S. PATENT DOCUMENTS 5,657,426 A * 8/1997 Waters et al. ............... 704/276
5,815,196 A * 9/1998 Alshawi .................. 348/14.12
6,507,643 B1 * 1/2003 Groner .................... 379/88.14

* cited by examiner

*Primary Examiner*—Daniel Abebe
(74) *Attorney, Agent, or Firm*—Jean-Paul A. Nasser; James M. Kasischke; Michael P. Stanley

(57) ABSTRACT

A speech to visual display translator assembly and method for converting spoken words directed to an operator into essentially simultaneous visual displays wherein the spoken words are presented in phonems and variations in loudness and tone, and/or other characteristics of phonemes displayed, are presented visually by the display.

13 Claims, 2 Drawing Sheets

| CONSONANT SOUNDS | | | |
|---|---|---|---|
| 1 | P | as in | s i p |
| 2 | P | as in | p e n |
| 3 | b | as in | b i t |
| 4 | m | as in | m a p |
| 5 | w | as in | wi t |
| 6 | ou | as in | o u t |
| 7 | f | as in | f a t |
| 8 | v | as in | v a t |
| 9 | t | as in | t h i n |
| 10 | th | as in | t h i s |
| 11 | st | as in | s t e p |
| 12 | t | as in | t i p |
| 13 | d | as in | d i p |
| 14 | n | as in | n i p |
| 15 | l | as in | l i p |
| 16 | tt | as in | u t t e r |
| 17 | s | as in | s i p |
| 18 | z | as in | z i p |
| 19 | r | as in | r e d |
| 20 | ss | as in | m i s s i o n |
| 21 | s | as in | v i s i o n |
| 22 | ck | as in | s i c k |
| 23 | k | as in | k i s s |
| 24 | g | as in | g i v e |
| 25 | ng | as in | k i n g |
| 26 | y | as in | y e t |
| 27 | i | as in | b i t e |
| 28 | h | as in | h i t |

10

| VOWEL SOUNDS | | | |
|---|---|---|---|
| 29 | ee | as in | b e e t |
| 30 | i | as in | b i t |
| 31 | i | as in | b i d |
| 32 | ai | as in | a i d |
| 33 | a | as in | a t |
| 34 | ur | as in | h u r t |
| 35 | e | as in | b e t |
| 36 | a | as in | a b o u t |
| 37 | u | as in | p u t t |
| 38 | a | as in | f a t h e r |
| 39 | oo | as in | f o o d |
| 40 | oo | as in | f o o t |
| 41 | oe | as in | t o e |
| 42 | aw | as in | l a w |

10

| CONSONANT SOUNDS | | | |
|---|---|---|---|
| 1 | p | as in | sip |
| 2 | p | as in | pen |
| 3 | b | as in | bit |
| 4 | m | as in | map |
| 5 | w | as in | wit |
| 6 | ou | as in | out |
| 7 | f | as in | fat |
| 8 | v | as in | vat |
| 9 | t | as in | thin |
| 10 | th | as in | this |
| 11 | st | as in | step |
| 12 | t | as in | tip |
| 13 | d | as in | dip |
| 14 | n | as in | nip |
| 15 | l | as in | lip |
| 16 | tt | as in | utter |
| 17 | s | as in | sip |
| 18 | z | as in | zip |
| 19 | r | as in | red |
| 20 | ss | as in | mission |
| 21 | s | as in | vision |
| 22 | ck | as in | sick |
| 23 | k | as in | kiss |
| 24 | g | as in | give |
| 25 | ng | as in | king |
| 26 | y | as in | yet |
| 27 | i | as in | bite |
| 28 | h | as in | hit |

10

| VOWEL SOUNDS | | | |
|---|---|---|---|
| 29 | ee | as in | beet |
| 30 | i | as in | bit |
| 31 | i | as in | bid |
| 32 | ai | as in | aid |
| 33 | a | as in | at |
| 34 | ur | as in | hurt |
| 35 | e | as in | bet |
| 36 | a | as in | about |
| 37 | u | as in | putt |
| 38 | a | as in | father |
| 39 | oo | as in | food |
| 40 | oo | as in | foot |
| 41 | oe | as in | toe |
| 42 | aw | as in | law |

10

FIG. 2

SPEECH TO VISUAL AID TRANSLATOR ASSEMBLY AND METHOD

STATEMENT OF GOVERNMENT INTEREST

The invention described herein may be manufactured and used by and for the Government of the United States of America for Governmental purposes without the payment of any royalties thereon or therefor.

CROSS-REFERENCE TO RELATED PATENT APPLICATIONS

This patent application is co-pending with one related patent application Ser. No. 10/292,953 entitled DISCRIMINATING SPEECH TO TOUCH TRANSLATOR ASSEMBLY AND METHOD, by the same inventor as this application.

BACKGROUND OF THE INVENTION (1) Field of the Invention

The invention relates to an assembly and method for assisting a person who is hearing impaired to understand a spoken word, and is directed more particularly to an assembly and method including a visual presentation of basic speech sounds (phonemes) directed to the person.

(2) Description of the Prior Art

Various devices and methods are known for enabling hearing-handicapped individuals to receive speech. Sound amplifying devices, such as hearing aids are capable of affording a satisfactory degree of hearing to some with a hearing impairment.

Partial hearing loss victims seldom, if ever, recover their full range of hearing with the use of hearing aids. Gaps occur in a person's understanding of what is being said because, for example, the hearing loss is often frequency selective and hearing aids are optimized for the individuals in their most common acoustic environment. In other acoustic environments or special situations the hearing aid becomes less effective and there are larger gaps of not understanding what is said. An aid optimized for a person in a shopping mall environment will not be as effective in a lecture hall.

With the speaker in view, a person can speech read, i.e., lip read, what is being said, but often without a high degree of accuracy. The speaker's lips must remain in full view to avoid loss of meaning. Improved accuracy can be provided by having the speaker "cue" his speech using hand forms and hand positions to convey the phonetic sounds in the message. The hand forms and hand positions convey approximately 40% of the message and the lips convey the remaining 60%. However, the speaker's face must still be in view.

The speaker may also convert the message into a form of sign language understood by the deaf person. This can present the message with the intended meaning, but not with the choice of words or expression of the speaker. The message can also be presented by fingerspelling, i.e., "signing" the message letter-by-letter, or the message can simply be written out and presented.

Such methods of presenting speech require the visual attention of the hearing-handicapped person.

There is thus a need for a device which can convert, or translate, spoken words to visual signals which can be seen by a hearing impaired person to whom the spoken words are directed.

SUMMARY OF THE INVENTION

Accordingly, an object of the invention is to provide a speech to visual aid translator assembly and method for converting a spoken message into visual signals, such that the receiving person can supplement the speech sounds received with essentially simultaneous visual signals.

A further object of the invention is to detect and convert to digital format information relating to a word sound's emphasis, including the suprasegmentals, i.e., the rhythm and rising and falling of voice pitch, and the intonation contour, i.e., the change in vocal pitch that accompanies production of a sentence, and to incorporate the digital information into the display format by way of image intensity, color, constancy (blinking, varying intensity, flicker, and the like).

With the above and other objects in view, a feature of the invention is the provision of a speech to visual translator assembly comprising an acoustic sensor for detecting word sounds and transmitting the word sounds, a sound amplifier for receiving the word sounds from the acoustic sensor and raising the sound signal level thereof, and transmitting the raised sound signal, a speech sound analyzer for receiving the raised sound signal from the sound amplifier and determining (a) frequency thereof, (b) relative loudness variations thereof, (c) suprasegmental information therein, (d) intonational contour information therein, and (e) time sequence thereof, converting (a)–(e) to data in digital format, and transmitting the data in the digital format. A phoneme sound correlator receives the data in digital format and compares the data with a phonetic alphabet. A phoneme library is in communication with the phoneme sound correlator and contains all phoneme sounds of the selected phonetic alphabet. The translator assembly further comprises a match detector in communication with the phoneme sound correlator and the phoneme library and operative to sense a predetermined level of correlation between an incoming phoneme and a phoneme resident in the phoneme library, and a phoneme buffer for (a) receiving phonetic phonemes from the phoneme library in time sequence, and for (b) receiving from the speech sounds analyzer data indicative of the relative loudness variations, suprasegmental information, intonational information, and time sequences thereof, and for (c) arranging the phonetic phonemes from the phoneme library and attaching thereto appropriate information as to relative loudness, supra-segmental and intonational information, for transmission to a display which presents phoneme sounds as phoneticized words. The user sees the words in a "traveling sign" format with, for example, the intensity of the displayed phonems dependent on the relative loudness with which it was spoken, and the presence of the suprasegmentals and the intonation contours.

In accordance with a further feature of the invention, there is provided a method for translating speech to a visual display. The method comprises the steps of sensing word sounds acoustically and transmitting the word sounds, amplifying the transmitted word sounds and transmitting the amplified word sounds, analyzing the transmitted amplified word sounds and determining the (a) frequency thereof, (b) relative loudness variations thereof, (c) suprasegmental information thereof, (d) intonational contour information thereof, and (e) time sequences thereof, converting (a)–(e) to data in digital format, transmitting the data in digital format, comparing the transmitted data in digital format with a phoneticized alphabet in a phoneme library, determining a selected level of correlation between an incoming phoneme and a phoneme resident in the phoneme library, arraying the phonemes from the phoneme library in time sequence and attaching thereto the (a)–(d) determined from the analyzing of the amplified word sounds, and placing the arranged phonemes in formats for presentation on the visual display, the presentation intensities being correlated with (a)–(e) attached thereto.

The above and other features of the invention, including various novel combinations of components and method steps, will now be more particularly described with reference to the accompanying drawings and pointed out in the claims. It will be understood that the particular assembly and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein:

FIG. 2 is a chart showing an illustrative arrangement of spoken sounds, or phonemes, which can be used by the assembly to render a visual presentation of spoken words.

DESCRIPTION OF THE PREFERRED EMBODIMENTS

Figure 1:
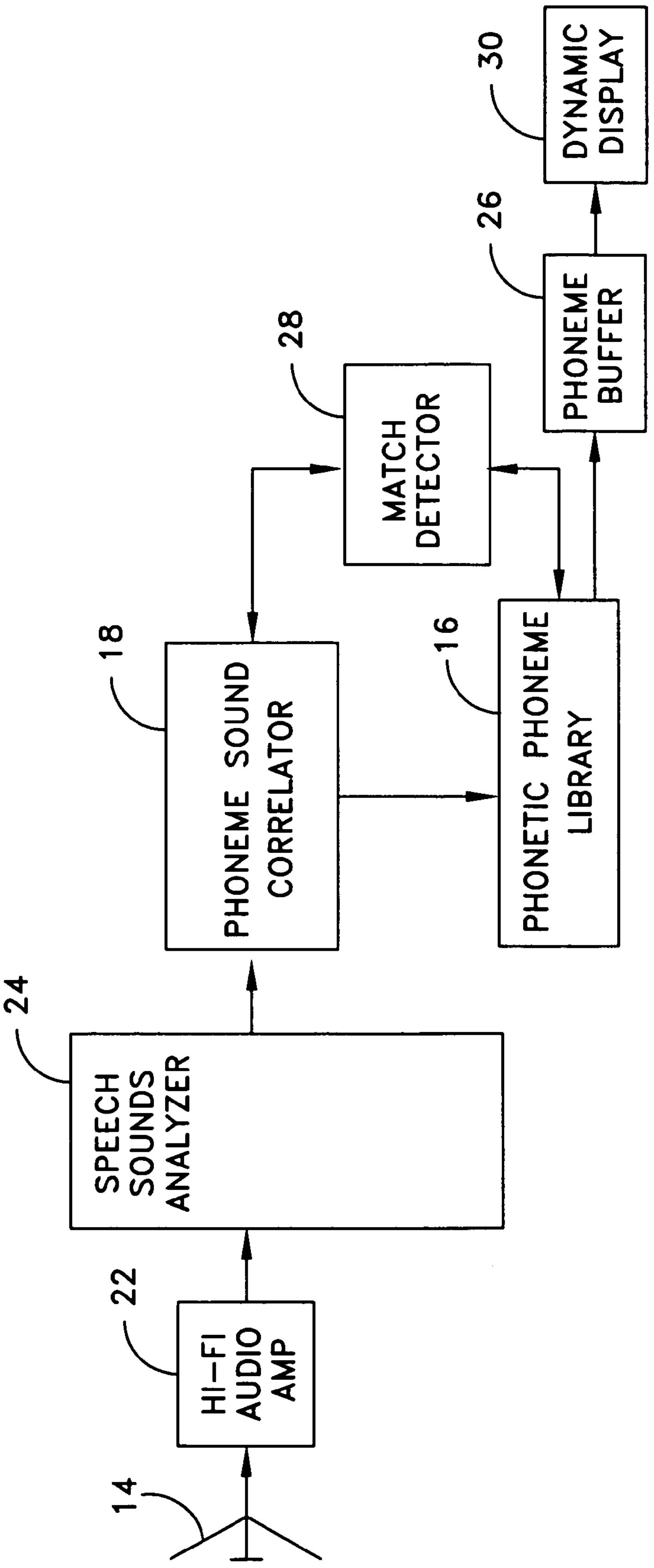
FIG. 1 is a block diagram illustrative of one form of the assembly and illustrative of an embodiment of the invention.

Only 40+ speech sounds represented by a phonetic alphabet, such as the Initial Teaching Alphabet (English), shown in FIG. 2, or the more extensive International Phonetics Alphabet (not shown), usable for many languages, need to be considered in dynamic translation of speech sounds, or phonemes 10 to visual display.

In practice, the user listens to a speaker, or some other audio source, and simultaneously reads the coded, phoneticized words on the display. The display presents phoneme sounds as phoneticized words. The user sees the words in an array of liquid crystal cells in chronological sequence or, alternatively, in a "traveling sign" format, for example, with the intensity of the displayed phonemes dependent on the relative loudness with which words were spoken. Suprasegmentals and intonation contours can be sensed and be represented by image color and flicker, for example. The phoneticized words appear in chronological sequence with appropriate image accents.

The phonemes 10 comprising the words in a sentence are sensed via electro-acoustic means 14 and amplified to a level sufficient to permit their analysis and breakdown of the word sounds into amplitude and frequency characteristics in a time sequence. The sound characteristics are put into a digital format and correlated with the contents of a phonetic phoneme library 16 that contains the phoneme set for the particular language being used.

A correlator 18 compares the incoming digitized phoneme with the contents of the library 16 to determine which of the phonemes in the library, if any, match the incoming word sound of interest. When a match is detected, the phoneme of interest is copied from the library and is dispatched to a coding means where the digitized form of the phoneme is coded into combinations of phonemes, in a series of combinations representing the phoneticized words being spoken. A six digit binary code, for example, is sufficient to permit the coding of all English phonemes, with spare code capacity for about 20 more. An additional digit can be added if the language being phonetized contains more phonemes than can be accommodated with six digits.

The practice or training required to use the device is similar to learning the alphabet. The user has to become familiar with the 40 some odd letter/symbols representing the basic speech sounds of the Initial Teaching Alphabet or the International Phonetics Alphabet, for example. By using the device in a simulation mode, a person would be able to listen to the spoken words (his own, a recording, or any other source) and see the phoneticized words in a dynamic manner. Other information relating to a word sound's emphasis, the suprasegmentals (rhythm and the rising and falling of voice pitch) and the sentence's intonation contour (change in vocal pitch that accompanies production of a sentence), which can have a strong effect on the meaning of a sentence, can be incorporated into the display format via image intensity, color, flicker, etc. The technology for such a device exists in the form of acoustic sensors, amplifiers and filters, speech sound recognition technology and dynamic displays. All are available in various military and/or commercial equipment.

Referring to FIG. 1, the directional acoustic sensor 14 detects the word sounds produced by a speaker or other source. The directional acoustic sensor preferably is a sensitive, high fidelity microphone suitable for use with the frequency range of interest.

A high fidelity sound amplifier 22 raises a sound signal level to one that is usable by a speech sound analyzer 24. The high fidelity acoustic amplifier 22 is suitable for use with the frequency range of interest and with sufficient capacity to provide the driving power required by the speech sound analyzer 24.

The analyzer 24 determines the frequencies, relative loudness variations and their time sequence for each word sound sensed. The speech sound analyzer 24 is further capable of determining the suprasegmental and intonational characteristics of the word sound, as well as contour characteristics of the sound. Such information, in time sequence, is converted to a digital format for later use by the phoneme sound correlator 18 and a phoneme buffer 26. The determinations of the analyzer 24 are presented in a digital format to the phoneme sound correlator 18.

The correlator 18 uses the digitized data contained in the phoneme of interest to query the phonetic phoneme library 16, where the appropriate phoneticized alphabet is stored in a digital format. Successive library phoneme characteristics are compared to the incoming phoneme of interest in the correlator 18. A predetermined correlation factor is used as a basis for determining "matched" or "not matched" conditions. A "not matched" condition results in no input to the phoneme buffer 26. The correlator 18 queries the phonetic alphabet phoneme library 16 to find a digital match for the word sound characteristics in the correlator.

The library 16 contains all the phoneme sounds of a phoneticized alphabet characterized by their relative amplitude and frequency content in a time sequence. When a match detector 28 signals a match, the appropriate digitized phonetic phoneme is copied from the phoneme buffer 26, where it is stored and coded properly to activate the appropriate visual display to be interpreted by the user as a particular phoneme.

When a match is detected by the match detector 28, the phoneme of interest is copied from the library 16 and stored in the phoneme buffer 26, where it is coded for actuation of the appropriate display. The match detector 28 is a correlation detection device capable of sensing a predetermined level of correlation between an incoming phoneme and one resident in the phoneme library 16. At this time, it signals the library 16 to enter a copy of the appropriate phoneme into the phoneme buffer 26.

The phoneme buffer 26 is a digital buffer which assembles and arranges the phonetic phonemes from the library in their proper time sequences and attaches any relative loudness, suprasegmental and intonation contour information for use by the display in presenting the stream of phonemes with any loudness, suprasegmental and intonation superimpositions.

The display 30 presents a color presentation of the sound information as sensed by the Visual Aid to Hearing Device. The phonetic phonemes 10 from the library 16 are seen by the viewer with relative loudness, suprasegmentals and intonation superimpositions represented by image intensity, color and constancy (flicker, blinking, and varying intensity, for example). The number of phonetic phonemes displayed can be varied by increasing the time period covered by the display. The phonemes comprising several consecutive words in a sentence can be displayed simultaneously and/or in a "traveling sign" manner to help in understanding the full meaning of groups of phoneticized words. The display function can be incorporated into a "heads up" format via customized eye glasses or a hand held device, for example. The heads up configuration is suitable for integrating into eyeglass hearing aid devices, where the heads up display is the lens set of the glasses.

There is thus provided a speech to visual translator assembly which enables a person with a hearing handicap to better understand the spoken word. The assembly provides visual reinforcement to the receiver's auditory reception. The assembly can be customized for many languages and can be easily learned and practiced.

It will be understood that many additional changes in the details, method steps and arrangement of components, which have been herein described and illustrated in order to explain the nature of the invention, may be made by those skilled in the art within the principles and scope of the invention as expressed in the appended claims.

What is claimed is:

1. A speech to visual aid translator assembly comprising:

an acoustic sensor for detecting word sounds and transmitting the word sounds;

a sound amplifier for receiving the word sounds from said acoustic sensor and raising the sound signal level thereof, and transmitting the raised sound signal;

a speech sound analyzer for receiving the raised sound signal from said sound amplifier and determining, (a) frequency thereof, (b) relative loudness Variations thereof, (c) suprasegmental information thereof, (d) intonational contour information thereof, and (e) time sequence thereof;

converting (a)–(e) to data in digital format and transmitting the data in the digital format;

a phoneme sound correlator for receiving the data in digital format and comparing the data with a phoneticized alphabet;

a phoneme library in communication with said phoneme sound correlator and containing all phoneme sounds of the selected phoneticized alphabet;

a match detector in communication with said phoneme sound correlator and said phoneme library and operative to sense a predetermined level of correlation between an incoming phoneme and a phoneme resident in said phoneme library;

a phoneme buffer for (i) receiving phonetic phonemes from said phoneme library in time sequence, and for (ii) receiving from said speech sounds analyzer data indicative of the relative loudness variations, suprasegmental information, intonational information, and time sequences thereof, and for (iii) arranging the phonetic phonemes from said phoneme library and attaching thereto appropriate information as to relative loudness, supra-segmental and intonational characteristics, for use in a format to actuate combinations of phonemes and intensities thereof; and a display for presenting the phonemes.

2. The assembly in accordance with claim 1 wherein said acoustic sensor comprises a directional acoustic sensor.

3. The assembly in accordance with claim 2 wherein said directional acoustic sensor comprises a high fidelity microphone.

4. The assembly in accordance with claim 2 wherein said speech sound amplifier is a high fidelity sound amplifier adapted to raise the sound signal level to a level usable by said speech sound analyzer.

5. The assembly in accordance with claim 4 wherein said speech sound amplifier is powered sufficiently to drive itself and said speech sound analyzer.

6. The assembly in accordance with claim 1 wherein said phoneme sound correlator is adapted to compare any of (a)–(e) with the same characteristics of phonemes stored in said phoneme library.

7. The assembly in accordance with claim 6 wherein said phoneme library contains all of the phoneme sounds of the selected phoneticized alphabet and their characterizations with respect to (a)–(e).

8. The assembly in accordance with claim 7 wherein said match detector, upon sensing the predetermined level of correlation, is operative to signal said phoneme library to enter a copy of the phoneme into said phoneme buffer.

9. The assembly in accordance with claim 8 wherein said phoneme buffer is a digital buffer and receives phonemes from said phoneme library in time sequence and in digitized form coded to actuate said display.

10. A method for translating speech to a visual display, the method comprising the steps of:

sensing word sounds acoustically and transmitting the word sounds;

amplifying the transmitted word sounds and transmitting the amplified word sounds;

analyzing the transmitted amplified word sounds and determining, (a) frequency thereof, (b) relative loudness variations thereof, (c) suprasegmental information thereof, (d) intonational contour information thereof, (e) time sequences thereof;

converting (a)–e) to data in digital format and transmitting the data in digital format;

comparing the transmitted data in digital format with a phoneticized alphabet in a phoneme library;

determining a selected level of correlation between an incoming phoneme and a phoneme resident in the phoneme library;

arranging the phonemes from the phoneme library in time sequence and attaching thereto (a)–(d) determined from the analyzing of the amplified word sounds; and placing the arranged phonemes in formats for presentation on the visual display, the visual presentation being variable and correlated with respect to the influence of (a)–(e) thereon.

11. The method in accordance with claim 10 wherein the sensing and transmission of word sounds is accomplished by a directional high fidelity acoustic sensor.

12. The method in accordance with claim 11 wherein the amplifying of the word sounds transmitted by the acoustic sensor is accomplished by a high fidelity sound amplifier adapted to raise the sound signal level to a level usable in the analyzing of the word sounds.

13. The method in accordance with claim 10 wherein the visual presentation reflects the influence of (a)–(e) by variations in selected ones of color, intensity, and constancy.

* * * * *